United States Patent [19]

Oestreich

[11] Patent Number: 4,861,525

[45] Date of Patent: Aug. 29, 1989

[54] METHOD OF IDENTIFYING THE LENGTH DIFFERENCE BETWEEN AN OPTICAL FIBER AND AN ENVELOPE

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 177,172

[22] Filed: Apr. 4, 1988

[30] Foreign Application Priority Data

Apr. 13, 1987 [DE] Fed. Rep. of Germany ....... 3712516

[51] Int. Cl.$^4$ .......................... B29D 11/00; G02B 6/44
[52] U.S. Cl. ..................................... 264/1.5; 264/40.1; 264/173; 264/174; 425/140; 425/143
[58] Field of Search ....................... 264/1.5, 40.1, 40.7, 264/173, 174; 350/96.23; 425/140, 143

[56] References Cited

U.S. PATENT DOCUMENTS 4,237,082  12/1980  La Spisa ............................. 264/40.7

4,728,470  3/1988  Einsle et al. ........................ 264/1.5

FOREIGN PATENT DOCUMENTS 160632  11/1985  European Pat. Off. ........... 264/40.7
3425649  1/1986  Fed. Rep. of Germany .

*Primary Examiner*—James Lowe
*Attorney, Agent, or Firm*—Hill, Van Santen, Steadman & Simpson

[57] ABSTRACT

A method for identifying measured quantity proportions for the length difference between an optical element and the envelope for the optical lead when forming an optical lead, which has the envelope loosely receiving the optical element and the method includes extruding the envelope around the element and then passing the lead through at least one cooling path. The speed of the envelope is identified both proceeding as well as following the cooling path, and the desired quantities are formed by different uses of the two measured speeds.

19 Claims, 1 Drawing Sheet

METHOD OF IDENTIFYING THE LENGTH DIFFERENCE BETWEEN AN OPTICAL FIBER AND AN ENVELOPE

BACKGROUND OF THE INVENTION

The present invention is directed to a method for identifying a measured quantity proportional to a length difference between an optical element, which may be a fiber or a bundle of fibers, and an optical lead envelope, which receives the optical element as the optical lead passes through at least one cooling path.

In order to obtain a certain length allocation between optical elements, such as fibers or bundles of fibers, and a hose-shaped outside envelope, which is applied or formed by an extrusion, a manufacturing or processline is known wherein a certain optical fiber length is setby an adequate coupling of the optical fiber to an outside envelope. The coupling between an optical fiber and the envelope is thereby always achieved by looping around at least one large, easy running storage wheel that is situated at a prescribed temperature. A subsequent cooling effects the length change in the envelope wherewith a length allocation of the optical fiber or element to the envelope is achieved. An example of such a device is shown in U.S. Pat. No. 4,728,470, which is incorporated by reference thereto.

The actual length difference between the optical fiber and envelope thereby obtained cannot be identified with adequate precision with the measuring equipment employed up to now. German Published Application No. 34 25 649 discloses a measuring method wherein the length of the optical fiber in the envelope is acquired in that the draw-in rate of the optical fiber preceding the extruder and the speed of the optical lead following the cooling path are identified. Given such a comparative speed measurement between the optical fiber and the envelope, a precision on the order of magnitude of a few $10^{-3}$ is at most achieved in all length measuring methods known up to now. Since the length difference between the optical fiber and the envelope to be identified lies in the range of between 0 and $5 \times 10^{-3}$, a systematic deviation between desired and achieved fiber lengths in the loose envelope cannot be identified with adequately great precision.

SUMMARY OF THE INVENTION

The object of the present invention is to identify the length allocation between optical elements, such as a fiber or a bundle of fibers, and the optical lead envelope as exactly as possible in the optical lead line.

According to the invention, this is achieved in an improvement in a method identifying the measured quantity proportional to the length differences between the optical element and the envelope of the optical lead, wherein the envelope of the optical lead loosely contains the optical element and the optical lead passes through at least one cooling path. The improvement is that the speed of travel of the envelope is identified both preceding as well as following the cooling path and the sought measured quantity is formed by obtaining the difference in the speed between the two measured speeds.

The speed of the envelope is first measured preceding the cooling bath, i.e. at a constantly elevated temperature. The initial fiber or element mislength is determined rather precisely by the optical lead dimensions and, for example, by running the optical leads around at least one storage wheel. Since the cooling of the optical leads following the cooling paths effects a defined shrinkage and an increase in the speed of travel of the envelope of the optical lead, a further speed measurement is carried out at this locatio. The length allocation between the optical fiber and the envelope is determined with particular accuracy by the measured quantities obtained from the difference formed from the two measured speeds for the envelope of the optical lead. Since, in an optical lead or production line, the speed measurement for the envelope occur under defined and entirely comparable conditions, an extremely precise measurement and, thus, an adjustment in monitoring of the relatively optical fiber or element length are, thus enabled. Since the measurement is alway carried out only at the optical lead, in contrast to the prior art, where the lead and fiber are measured, an identical measuring method and measuring means operating with greatly reduced errors can be used in both instances, and this reduces the costs and improves the measuring precision. Since the measurement is carried out at the optical leads, measuring wheels can be advantageously used, and these can be large and are looped by the lead to such an extent that a slip between the lead and the measuring wheel becomes negligible. It is provided, in an especially advantageous embodiment of the invention, that the speed measurement is undertaken by pulse counting at the measuring wheels preceding and following the cooling path.

Storage wheels that are already present for other reasons can, thereby, particularly, be simultaneously utilized as the measuring wheels. When the storage wheels themselves are utilized for speed identification, additional speed measuring equipment is eliminated.

In an especially advantageous employment of a large measuring or, respectively, storage wheel, and either on the basis of the pulse marks applied to the wheel, or on the basis of separate pulse generators connected to the shafts of the wheels, the running length of the envelope before and following the cooling is identified with the utmost precision in a simple way.

Other advantages and features of the invention will be readily apparent from the following description of the drawings, the preferred embodiments and claims.

DESCRIPTION OF THE PREFERRED EMBODIMENTS

Figure 1:
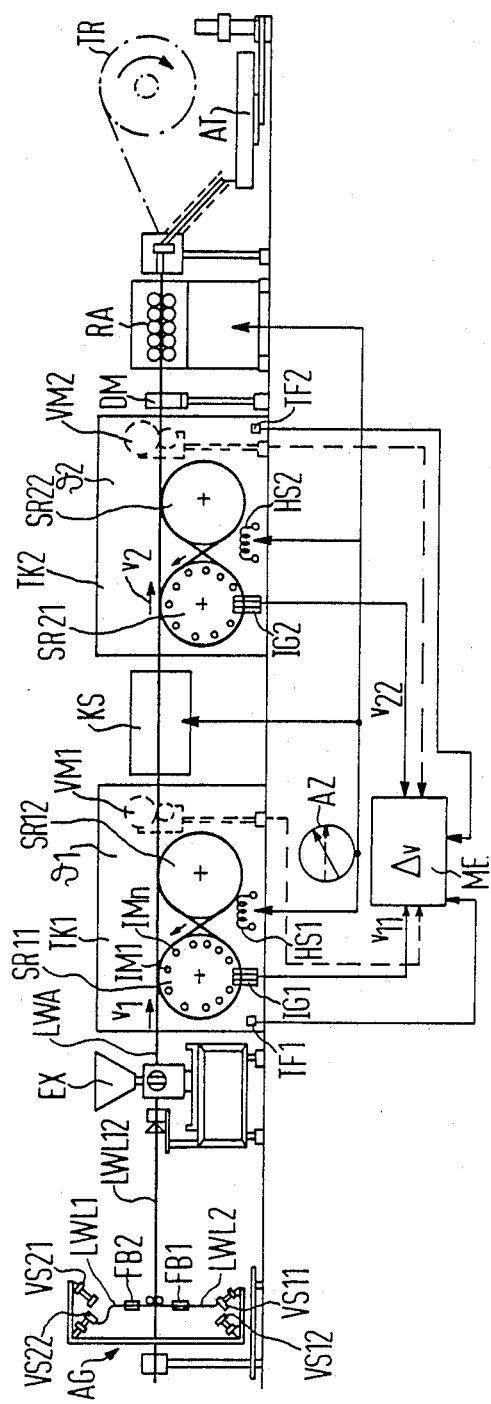
FIG. 1 is a schematic illustration of an optical lead production line comprising an apparatus for performing the method of the present invention.

A horizontal production line, shown in FIG. 1, comprises a pay-out stand AG that is equipped with supply reels VS11, VS12, VS21 and VS22. Unwinding optical fibers LWL1 and LWL2 are combined through fiber brakes FB1 and FB2, respectively, to form a bundle LWL12 in a known way after deflection by appropriate rollers. The fibers can be partially SZ-stranded to one another using a pipe store. Instead of a bundle of optical fibers, it is also possible to handle only a single optical fiber in a way set forth below. It should be noted hereinafter, that LWL12 is an optical element, which may be either a bundle of fibers or a single fiber.

The optical element LWL12 proceeds to an extruder EX, which applies an envelope or tube H to form the optical lead LWA. It should be noted that at the time of extruding the envelope H on the element LWL12, a filling compound can be inserted into the envelope H, which envelope is formed of a plastic material and is applied to the entering optical element LWL12 passing through the extruder. At the output of the extruder EX, the optical lead LWA enters directly into a first tempered chamber TK1 having a temperature $\theta_1$ without passing through a cooling path. This first temperature chamber TK1 contains two large, easy running storage reels SR11 and SR12, which may be driven by a motor or motors. The storage wheels SR11 and SR12 are looped by the lead in a figure eight configuration, such as with the lead passing over the top of the wheel SR11 under and around the wheel SR12, back under and around the wheel SR11 and then out the opposite side of the chamber TK1 from the entrance. The temperature $\theta_1$ of the chamber TK1 is preferably held in a range between 40° and 140° C. A cooling path KS, which may be either a water cooling or an air stream, is provided at the output of the first chamber TK1 before the optical lead LWA enters into a second tempered chamber TK2 having a temperature $\theta_2$ that is constructed in exactly the same fashion as the first chamber TK1. It is assumed in the present example that the storage reels SR21 and SR22 of the second chamber are looped in the form of a figure eight, as in the first chamber TK1. The temperature $\theta_2$ in the second chamber TK2 is preferably selected to be in the range of between room temperature and 40° C. A thickness measuring means DM is provided at the output side of the second chamber TK2 before the cool optical lead LWA proceeds to a caterpillar-type pull-off device RA. At the end of the production line, the optical lead LWA can be wound, either onto a plate coiler AT, or onto a cable reel TR (which is shown in broken lines in FIG. 1).

In order to identify the length allocation between the optical element LWL12 and the envelope H of the optical lead LWA (FIG. 2), with an optimum precision, a speed measuring of the envelope H occurs at one of the storage wheels in the chamber TK1 and also at one of the storage wheels in the chamber TK2 after an adequately stable temperature equilibrium has been reached. For this purpose, pulse marks IM1-IMn can be distributed over the circumference of the storage wheel, for example the wheel SR11 of chamber TK1, with these marks being adjacent the peripheral edge of the wheel, and these pulse marks generae pulses at a pulse generator IG1 during rotation of the wheel SR1. It is also possible to use a commercially available pulse generator, which is mounted on the shaft for the particular wheel, such as SR11. A pulse sequence $v_{11}$ is proportional to the speed $v_1$ of the optical lead and its envelope H on the storage wheel SR11. This pulse sequence is conducted to a measurimg equipment ME. An identical procedure is carried out for the storage wheel, such as the wheel SR21 of the second chamber TK2, wherein the speed $v_2$ of the optical lead and the envelope H will proceed as a series of pulse sequence $v_{22}$ from a pulse generator IG2 and applied to the measuring equipment ME. A difference formation $\Delta v$ of the speeds $v_1$ and $v_2$ occurs in the measuring equipment ME. The relative optical fiber length is calculated therefrom by a process computer, and this can be displayed in a display instrument AZ. When the relative optical fiber length is displayed, the relative fiber length deviates from a desired rate (which desired rate is shown in broken lines in the display instrument), this, for example, can be followed up by changing the temperature by a control circuit. The change in the temperature difference $\theta_2 - \theta_1$ is critical for the length adjustment and can occur by regulating the temperature $\theta_1$ through a heating element HS1 in the first tempering chamber TK1. It is also possible to change the temperature $\theta_2$ of the second chamber TK2 by a heating element HS2 or to change the temperature of the cooling path KS.

However, it is also possible to measure the speed $v_1$ or $v_2$ by independent speed measuring equipments VM1 and VM2, which are shown in broken lines in FIG. 1, and to supply these speeds to the measuring equipment ME. The optical lead envelope H passing through two rollers whose rotational speed is proportional to the envelope throughput speed. The still hot envelope of the optical lead LWA could also be provided with measuring marks that are counted twice per time unit, once in the chamber TK1 and once in the chamber TK2. A simple offset printer that is synchronously driven can be useed for the purpose of marking the envelope. This method is very precise, as long as a potential slip is kept constant.

Figure 2:
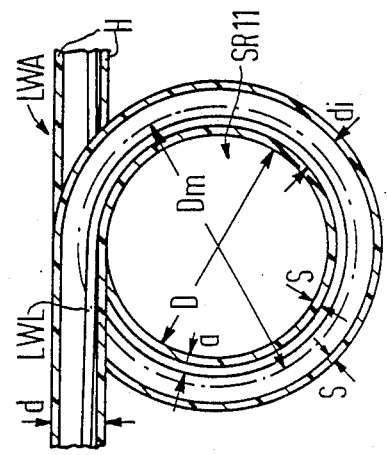
FIG. 2 is a cross sectional view of a storage wheel loop of the optical lead.

The relationship between the speed or, respectively, the length of the optical element LWL, when looping a storage wheel, for example SR11, can now be seen, as set forth in greater detail in FIG. 2.

When an optical lead LWA, whose inside diameter di is larger than a diameter a of the optical element LWL, which may be either a single fiber or an optical fiber bundle, is wound around a storage wheel SR11 having a diameter D, the optical element LWL will place itself against an inside wall of the envelope H, which is closest to the axis of the wheel. For calculating the mislength $\epsilon_-$ which will occur, FIG. 2 also shows the wall thickness S of the envelope H, the outside diameter d of the optical lead LWA, as well as the average optical running diameter Dm. According to FIGS. 1 and 2, the mislength $\epsilon_-$ occurring at the first storage wheel SR11 can be calculated as follows:

$$\epsilon_- = \frac{\Delta l_2}{1} = \frac{Dm - (D + 2s + a)}{Dm} = \frac{d - 2s - a}{D + d} = \frac{di - a}{D + d} \quad (1)$$

by a transformation of $Dm = D + d$ and $d - 2s = di$, the above equation occurs. The relative shortening of the envelope H, in comparison to the optical element LWL occurs as a result of the cooling, and given the assumption of free shrinkage is $$\frac{\Delta l_1}{1} = \int_{\theta_2}^{\theta_1} \alpha_H \cdot d\theta \quad (2)$$

wherein $\alpha_H$ is the coefficient of expansion of the envelope H. A relative fiber length, thus, occurs at $$\frac{\Delta l_{eff}}{1} = \frac{\Delta l_1}{1} - \frac{\Delta l_2}{1} = \int_{\theta_2}^{\theta_1} \alpha_H \cdot d\theta - \frac{di - a}{D + d}. \quad (3)$$

Since the wheel diameter D of the first storage wheel SR11 working with elevated temperature $\theta_1$ and the dimensions of the optical lead LWA determines the fiber mislength $\epsilon_-$ occurring at a fixed temperature $\theta_1$ rather precisely, according to the relationship cited in equation 1, the relative fiber length $\Delta l_{eff}/l$ can be calculated with a process computer when the difference in speed of the envelope H resulting from the cooling via the cooling path KS, can be measured proceeding and following the cooling path. Upon assumption of slippage-free and nearly force-free operation, the part $$\int_{\theta_2}^{\theta_1} \alpha_H \cdot d\theta \qquad (3a)$$

can be well measured and the part $$\frac{di - a}{D + d} \qquad (3b)$$

can be exactly calculated, so that a process computer can calculate the resultant $\Delta l_{eff}/l$ and, if need be, can correct this result by changing the temperature differences $\theta_2 - \theta_1$ to a desired rated value. Differences in the circumference at the two storage wheels SR11 and SR22 can be eliminated by calibration at the same temperature. The unavoidable expansion of the warm storage wheel SR11, in comparison to the cold storage wheel SR22, can likewise be easily be computationally considered. The storage wheels without pulse counters, such as SR12 and SR22, only serve for the temperature matching.

The mean coefficient of expansion for the envelope plastic is about $1 \times 10^{-4}/K$ and for the storage wheel is about $1.2-2.3 \times 10^{-5}/K$ and is, therefore, clearly different. After calibration and correction has been carried out, a good relative precision can be achieved with this method in any case, whereby the pulse frequency per revolution determines the control speed given employment of pulse generators.

A numerical example of a measuring procedure of the invention is cited hereinbelow. It is, therefore, assumed that the two measuring wheels SR11 and SR22 have been calibrated at the same temperature, for example 20° C., so that $\theta_1 = \theta_2$.

In practical operation, for example during production, of course, at least $\theta_1$ is higher and it is assumed that the temperature sensor TF1 in the first chamber TK1 measures a temperature of 120° C. and the temperature sensor TF2 in the second chamber TK2 measures a temperature of 20° C. Thus, $\theta_1$ will be 120° C., $\theta_2$ will be 20° C. and $\Delta\theta$ will be 100° C. The temperature values $\theta_1$ and $\theta_2$ from the measuring sensors TF1 and TF2 are transmitted to the measuring equipment ME where the temperature correction factor k, derived as a consequence of a higher temperature $\theta_1 = 120°$ C. in the chamber TK1 in comparison to the preceding calibrations, is calculated, namely, according to the equation $$D^* = D \cdot (1 - \alpha_R \cdot \Delta\theta) = D \cdot k \qquad (4)$$

whereby D is the outside diameter for the seat of the light waveguide lead LWA at the calibration temperature of the measuring wheel SR11, $D^*$ is the diameter thereof at a higher operating temperature and $\alpha_R$ is the coefficient of the temperature expansion of the wheel.

When it is assumed that $D = 900$ mm, and the value of D should be selected to be in a range of between 400 mm and 1100 mm, with it being as large as possible in order to increase the precision, then $$k = 1 + 2.3 \cdot 10^{-5} \cdot 100 = 1.0023$$

derives given a $$\alpha_R = 2.3 \cdot 10^{-5}$$

Given this assumption,

D—900 mm, d=5 mm, di=3 mm, a=0.5 mm.

the relationship $$\frac{\Delta l_2}{l} = \frac{di - a}{d + D} = \frac{2.5}{905} = 2.76 \cdot 10^{-3}$$

also applies according to equation (1).

When, for example, the measurement of the speed $v_1$ of the measuring wheel SR11 yields the value $v_1 = 20$ m/min at the temperature $\theta_1 = 120°$ C., then the actual speed value $v_1^*$, of course, is higher, since only angular values are practically measured, namely, by the correction factor k, thus $$v_1^* = v_1 \cdot k = 20 \text{ m/min} \cdot 1.0023 = 20.046 \text{ m/min}.$$

When, for example, the measurement of the speed $v_2$ of the measuring wheel SR21 yields the value $v_2 = 19.876$ m/min, then the value $$\Delta v = v_1^* - v_2 = 20.046 - 19.876 = 0.170 \text{ m/min} \qquad (5)$$

Thus, the speed difference $\Delta v$ is obtained. The value of this relative speed difference can be inserted for $\Delta l_1/l$ according to equation (2), since this value corresponds to the actual shrinkage. Thus, applying is:

$$\frac{\Delta l_1}{l} = \frac{\Delta v}{v_2} = \frac{v_1^* - v_2}{v_2} = \frac{0.170}{19.876} = 0.0086 \qquad (2a)$$

The effective excess fiber length thus amounts to $$\frac{\Delta l_{eff}}{l} = \frac{\Delta l_1}{l} - \frac{\Delta l_2}{l} = 8.6 \cdot 10^{-3} - 2.76 \cdot 10^{-3} = 5.84 \cdot 10^{-3}$$

according to equation (3) upon insertion of (2a).

It is thereby of particular significance that the quantities $v_1$, $v_1^*$, $v_2$ and $\Delta v$ enter into the overall results only as relative measurements, so that potential, common errors, for example, either due to no matter how small a slip, or due to irregularities in the geometry of the lead envelope, are not expressed in the final results because they occur to the same extent in both measurements $v_1$ and $v_2$.

A largely exact identification, by measurement, of the values of the integral of equation (2) is also possible in this way, whereas the calculations would be relatively faulty as a consequence of the great temperature difference and of the uncertainties in the value of $\alpha_H$ connected therewith. When, for the monitoring of the basis of the geometry of the measuring wheels and on the basis of discrete quantities with reference to FIG. 2, the excess length is checked with the numerical values assumed above, then, for conditions which are, likewise, the same as in the preceding speed measurement example, the following occurs:

The identification of $\Delta l_1/l$ according to equation (2) yields $$= \int_{\theta_2}^{\theta_1} \alpha_H \cdot d\theta \approx \alpha_H \cdot \Delta\theta \approx 8 \cdot 10^{-5} \cdot 100 \approx 8 \cdot 10^{-3}$$

for a $\alpha_H \approx 8 \cdot 10^{-5}$

According to equation (3), $$\frac{\Delta l_{eff}}{1} = \frac{\Delta l_1}{1} - \frac{\Delta l_2}{1} =$$

is $8 \cdot 10^{-3} - 2.76 \cdot 10^{-3} = 5.34 \cdot 10^{-3}$.

This computational value roughly corresponds to the actual value identified and, subsequently corrected by speed measurements on the basis of measuring the relative speed difference according to equation (2a) of the preceding example.

The steps of the measurement are, thus:

1. Calibration of the measuring wheels SR11 and SR21 at identical temperatures, i.e., $\theta_1 = \theta_2$, with a measuring cable or the like, with the speed difference $\Delta v = v_2 - v_1 = 0$, i.e. likewise by relative measurement, here given the pulse genertors IG$_1$ and IG$_2$.

2. Measure angular deviations, for example speed differences, between the measuring wheels SR11 and SR22 during the operation of the production line of FIG. 1, for example, identification of $v_1$ and $v_2$ during the production of optical fiber leads LWA.

3. Taking temperature corrections for the difference, for example, relative to the calibrations, $\Delta\theta = \theta_1 - \theta_2$ into consideration with correction factor $k = 1 + \alpha_R \cdot \Delta\theta$ with $v_1^* = v_1 \cdot k$.

4. Identifying the relative speed differences in the measuring equipment ME with a process computer arranged therein as a measure of the value $$\frac{\Delta l_1}{1} = \frac{v_1^* - v_2}{v_2} = \frac{\Delta v}{v_2}$$

5. Identifying the effective excess fiber length according to equation (3)

$$\frac{\Delta l_{eff}}{1} = \frac{\Delta v}{v_2} - \frac{\Delta l_2}{1}$$

6. Potentially follow-up $$\frac{\Delta l_{eff}}{1}$$

when given a deviation from the rated value of the effective excess length by an appropriate value, for example, by adjusting the heater HS1 and, thus, the temperature $\theta_1$.

Although various minor modifications may be suggested by those versed in the art, it should be understood that I wish to embody within the scope of the patent granted hereon all such modifications as reasonably and properly come within the scope of my contribution to the art.

I claim:

1. In a method of identifying a measured quantity proportional to the length difference between an optical element and an envelope during a manufacture of an optical lead having the element loosely received in the envelope, said process including extruding the envelope around the element to form the lead and then passing the lead through at least one cooling path, the improvements comprising measuring the speed of travel of the envelope prior to entering the cooling path and measuring the speed of travel of the envelope after passing through the cooling path and determining the difference between the two measured speeds.

2. In a method according to claim 1, which includes maintaining the optical lead at a given first temperature prior to entering the cooling path and maintaining the lead at a second temperature after leaving the cooling path and varying the difference between the first and second temperatures in response to the measured difference in the speeds in order to achieve a desired length difference.

3. In a method according to claim 1, wherein the process includes controlling the temperature in at least one of the steps, and said measured difference in the speeds is used for controlling temperatures in at least one of said process steps.

4. In a method according to claim 1, wherein the process of manufacturing includes conducting the lead having the optical element and envelope over at least one storage wheel preceding the cooling path and over at least one storage wheel following the cooling path.

5. In a method accoring to claim 4, wherein the process includes maintaining the temperature in the region of the storage wheel preceding the cooling path in a first elevated temperature in a range of between 40° and 140° C.

6. In a method according to claim 5, which includes maintaining a second temperature in the region of the storage wheel following the cooling path in a range of between room temperature and 40° C.

7. In a method according to claim 4, wherein the conducting of the lead around the storage wheel has a looping angle of more than 180°.

8. In a method according to claim 1, which includes providing first and second regions, with each region having two storage wheels within a temperature chamber, the first region being in the path preceding the cooling path and the second region following the cooling path, and conducting the lead around the storage wheels in the form of a figure eight in both chambers.

9. In a method according to claim 1, wherein the passing of the optical lead through the cooling path passes the optical lead through a water bath.

10. In a method according to claim 1, wherein the step of passing the optical lead through a cooling path passes the optical lead through a cooling air stream.

11. In a method according to claim 1, wherein, prior to the cooling path, includes providing a first region having at least one storage wheel, engaging the storage wheel with the lead prior to passing through the cooling path, and said step of measuring the speed measures the rotation of said wheel.

12. In a method according to claim 11, which includes providing a second region having a least one storage wheel following the cooling path, passing the lead into engagement with said storage wheel of the second region, and said step of measuring the speed of the lead following the cooling path includes measuring the rotation of said wheel of the second region.

13. In a method according to claim 12, wherein the step of measuring the speed of rotation of the wheels is undertaken by pulse counting.

14. In a method according to claim 1, which includes maintaining the lead at a first elevated temperature before passing through the cooling path and maintaining the lead at a second temperature after passing through the cooling path and includes measuring the first and second temperatures and transmitting said values of the first and second temperatures to a measuring equipment for obtaining the speed differential.

15. In a method according to claim 14, which includes providing heating devices for maintaining at least one of the first and second temperatures and the steps of maintaining includes actuating the heating devices in response to the measured values for the first and second temperatures.

16. In a method according to claim 1, which includes obtaining a relative speed difference from the measured first and second speeds by subtracting the second measured speed from the first speed and dividing the difference by the second speed.

17. In a method according to claim 16, which includes providing a first tempering tank prior to the cooling path and providing a second tempering tank following the cooling path, each tank having at least one storage wheel, said method including calibrating the storage wheels by measuring the wheels under identical temperatures in the first and second tanks to obtain a zero speed differential by using a measuring cable.

18. In a method according to claim 17, which includes providing a temperature correction for the speed measurements for the temperature difference between the temperature in the first tank and the temperature in the second tank by utilizing a correction factor $k = 1 + \alpha_R \Delta\theta$, wherein $\alpha_R$ is the coefficient of expansion for the storage wheel and utilizing the correction factor to compensate for temperature dependent diameter changes between the storage wheels of the first and second tanks.

19. In a method according to claim 1, which includes providing first measuring wheels prior to the cooling path and second measuring wheels following the cooling path, identifying the relative speed difference of $(v_1 - v_2)/v_2$, wherein $v_1$ is the speed prior to entering the cooling path and $v_2$ is the speed after leaving the cooling path, subtracting the correction quantity that takes the mislength $\epsilon_-$ into consideration, wherein $\epsilon_- = (di - a)/(D + d)$, wherein D is the effective measuring wheel diameter, d is the outside diameter of the optical lead, a is the outside diameter of the optical element and di is the inside diameter of the envelope of the optical lead.

* * * * *